United States Patent
Emoto (10) Patent No.: US 12,301,665 B2
(45) Date of Patent: May 13, 2025

(54) COMMUNICATION PROCESSING DEVICE, COMMUNICATION PROCESSING METHOD AND PROGRAM, AND DATA STRUCTURE OF HEADER PART OF NETWORK LAYER

(71) Applicant: MITSUBISHI HEAVY INDUSTRIES, LTD., Tokyo (JP)

(72) Inventor: Hideaki Emoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 354 days.

(21) Appl. No.: 17/780,655

(22) PCT Filed: Oct. 26, 2020

(86) PCT No.: PCT/JP2020/040145
§ 371 (c)(1),
(2) Date: May 27, 2022

(87) PCT Pub. No.: WO2021/111763
PCT Pub. Date: Jun. 10, 2021

(65) Prior Publication Data
US 2023/0362283 A1  Nov. 9, 2023

(30) Foreign Application Priority Data
Dec. 5, 2019 (JP) ................................ 2019-220315

(51) Int. Cl.
*H04L 67/12* (2022.01)
*H04L 69/22* (2022.01)
*H04L 69/325* (2022.01)

(52) U.S. Cl.
CPC .............. *H04L 67/12* (2013.01); *H04L 69/22* (2013.01); *H04L 69/325* (2013.01)

(58) Field of Classification Search
CPC ........ H04L 69/22; H04L 69/325; H04L 67/12
See application file for complete search history.

(56) References Cited

U.S. PATENT DOCUMENTS

2005/0058078 A1*  3/2005  Jung ..................... H04W 99/00
                                                370/241
2008/0037540 A1*  2/2008  Ngo .................. H04L 12/40071
                                                370/392

(Continued)

FOREIGN PATENT DOCUMENTS

JP       2011-221846 A      11/2011
JP       2012-226680 A      11/2012

(Continued)

OTHER PUBLICATIONS

International Search Report dated Dec. 28, 2020, issued in counterpart application No. PCT/JP2020/040145. (9 pages).

(Continued)

*Primary Examiner* — Benjamin H Elliott, IV
(74) *Attorney, Agent, or Firm* — WHDA, LLP (57) ABSTRACT

A communication processing device includes a processing unit configured to process a network layer of a communication frame received from a transmission line. A header part of the network layer contains extension header presence/absence information that indicates whether the header part has an extension header part for defining header information different from header information defined by a standard header part standardly included in the header part. The processing unit includes: a first processing unit for processing the standard header part; a second processing unit for, if the header part has one or more extension header parts, individually processing the one or more extension header parts of the header part; and a determination unit for determining the presence or absence of an i+1th extension header part, based on the extension header presence/absence information contained in an i-th extension header part, where i is an integer of 1 or more.

7 Claims, 5 Drawing Sheets

(56) References Cited

U.S. PATENT DOCUMENTS

| | | | |
|---|---|---|---|
| 2010/0226315 A1* | 9/2010 | Das | H04W 28/065 370/328 |
| 2012/0272308 A1* | 10/2012 | Mishina | H04L 63/0209 726/11 |
| 2012/0317636 A1* | 12/2012 | Mishina | H04L 63/1408 726/11 |
| 2013/0038792 A1* | 2/2013 | Quigley | A61H 19/32 348/E5.009 |
| 2013/0083798 A1* | 4/2013 | Lakshmanamurthy | H04L 45/74 370/392 |
| 2013/0294347 A1* | 11/2013 | Das | H04L 1/0088 370/328 |
| 2015/0092779 A1* | 4/2015 | Lakshmanamurthy | G06F 15/7825 370/392 |
| 2017/0005925 A1* | 1/2017 | Yang | H04L 45/74 |
| 2019/0288944 A1* | 9/2019 | Yang | H04L 69/321 |
| 2020/0344332 A1* | 10/2020 | Hwang | H04L 69/22 |
| 2023/0362283 A1* | 11/2023 | Emoto | H04L 69/22 |

FOREIGN PATENT DOCUMENTS

| | | |
|---|---|---|
| JP | 2015-109679 A | 6/2015 |
| JP | 2016-116099 A | 6/2016 |

OTHER PUBLICATIONS

International Preliminary Report on Patentability (Form PCT/IB/338) issued in counterpart International Application No. PCT/JP2020/040145 dated Jun. 16, 2022, with PCT/IB/373, PCT/ISA/237, PCT/IB/326 with English machine translation. (12 pages).

\* cited by examiner

COMMUNICATION PROCESSING DEVICE, COMMUNICATION PROCESSING METHOD AND PROGRAM, AND DATA STRUCTURE OF HEADER PART OF NETWORK LAYER

TECHNICAL FIELD

The present disclosure relates to a processing technique for a network layer of an OSI reference model stored in a communication frame received from a transmission line.

BACKGROUND

A control device (e.g., DCS) of an industrial control system (ICS) which supports infrastructure such as oil, gas, electricity, and manufacturing is connected to a plurality of field devices installed in a plant via a control network to control and monitor these devices (see Patent Documents 1 and 2). For example, the control device communicates a command according to an instruction received from an operational device for operating and monitoring the plant to a destination field device via a control network to perform communication between the control device and the field device. More specifically, communication via the control network such as the communication of command (communication information) from the control device to a specific field device is performed by placing communication information on a payload part of a control frame and routing the control frame based on information such as a communication destination address stored in a header part of the control frame.

CITATION LIST

Patent Literature

Patent Document 1: JP2011-221846A
Patent Document 2: JP2012-226680A

SUMMARY

Problems to be Solved

In recent years, such an industrial control system has come to be connected to an external network such as the Internet. For this reason, the importance of security measures is increasing, and the requirements for availability and integrity of the system are being strengthened from time to time according to international standards. Specifically, for example, new header information for strengthening security measures may be added to the header part of the control frame to extend the function of the header part. However, it is a heavy burden to change the structure of the header part every time the function of the header part is extended.

In view of the above, an object of at least one embodiment of the present invention is to provide a communication processing device that can flexibly respond to function extension of a protocol of a network layer.

Solution to the Problems

A communication processing device according to at least one embodiment of the present invention comprises: a processing unit configured to process a network layer of a communication frame received from a transmission line. A header part of the network layer contains extension header presence/absence information that indicates whether the header part has an extension header part for defining header information different from header information defined by a standard header part standardly included in the header part. The processing unit includes: a first processing unit for processing the standard header part; a second processing unit for, if the header part has one or more extension header parts, individually processing the one or more extension header parts of the header part; and a determination unit for determining presence or absence of an i+1th extension header part, based on the extension header presence/absence information contained in an i-th extension header part, where i is an integer of 1 or more.

A communication processing method according to at least one embodiment of the present invention comprises: a processing step of processing a network layer of a communication frame received from a transmission line. A header part of the network layer contains extension header presence/absence information that indicates whether the header part has an extension header part for defining header information different from header information defined by a standard header part standardly included in the header part. The processing step includes: a step of processing the standard header part; a step of, if the header part has one or more extension header parts, individually processing the one or more extension header parts of the header part; and a determination step of determining presence or absence of an i+1th extension header part, based on the extension header presence/absence information contained in an i-th extension header part, where i is an integer of 1 or more.

A program according to at least one embodiment of the present invention is a program for implementing a processing unit configured to process a network layer of a communication frame received from a transmission line. A header part of the network layer contains extension header presence/absence information that indicates whether the header part has an extension header part for defining header information different from header information defined by a standard header part standardly included in the header part. The program is configured to cause a computer to implement the processing unit including: a first processing unit for processing the standard header part; a second processing unit for, if the header part has one or more extension header parts, individually processing the one or more extension header parts of the header part; and a determination unit for determining presence or absence of an i+1th extension header part, based on the extension header presence/absence information contained in an i-th extension header part, where i is an integer of 1 or more.

A data structure of a frame of a network layer according to the present invention is a data structure of a frame of a network layer having a header part and a payload part. The header part includes: a standard header part standardly included in the header part; and at least one extension header part for defining header information different from header information defined by the standard header part. An i-th extension header part contains extension header presence/absence information that indicates presence or absence of an i+1th extension header part, where i is an integer of 1 or more.

Advantageous Effects

At least one embodiment of the present invention provides a communication processing device that can flexibly respond to function extension of a protocol of a network layer.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
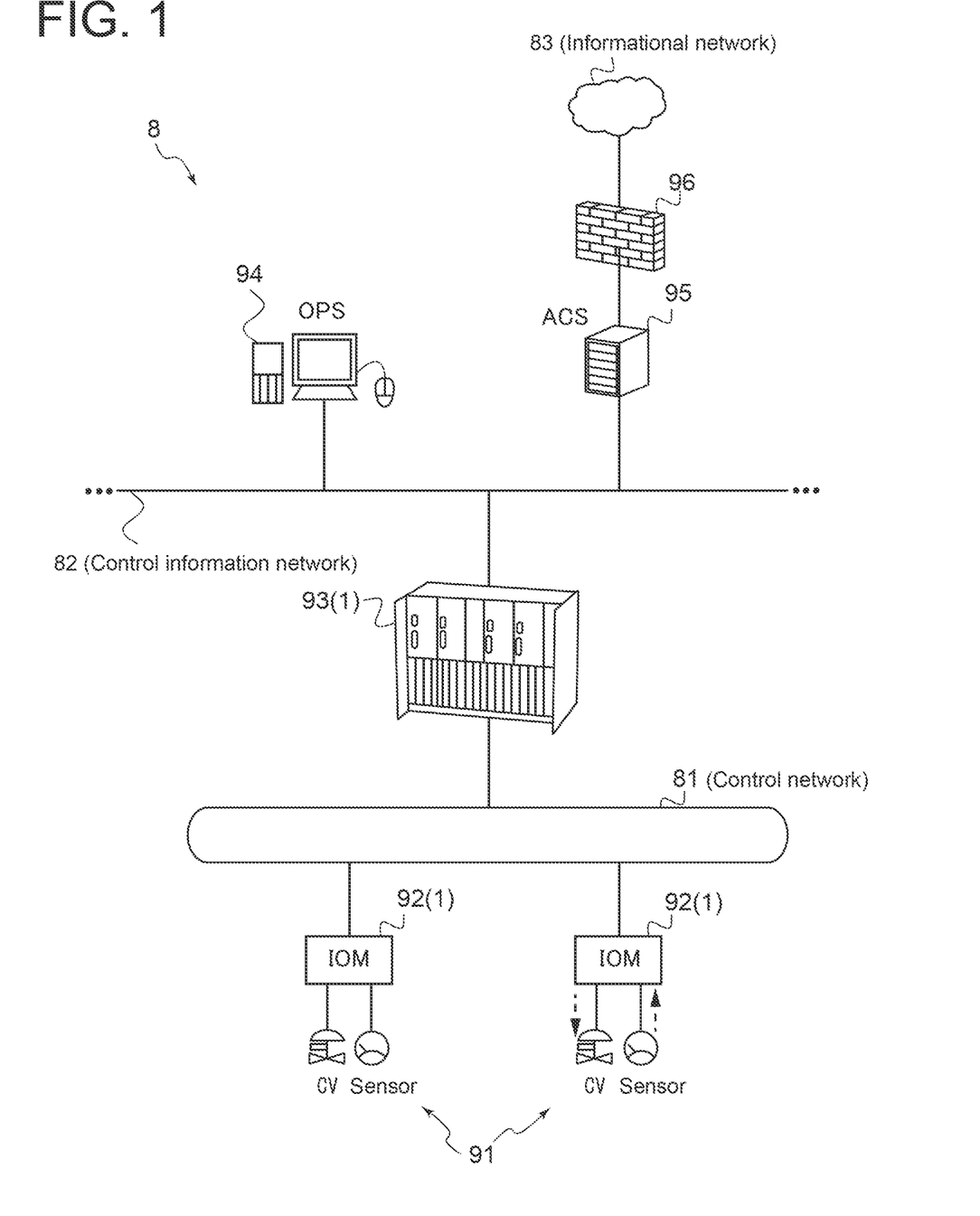
FIG. 1 is a schematic configuration diagram of a control system according to an embodiment of the present invention.
Figure 2:
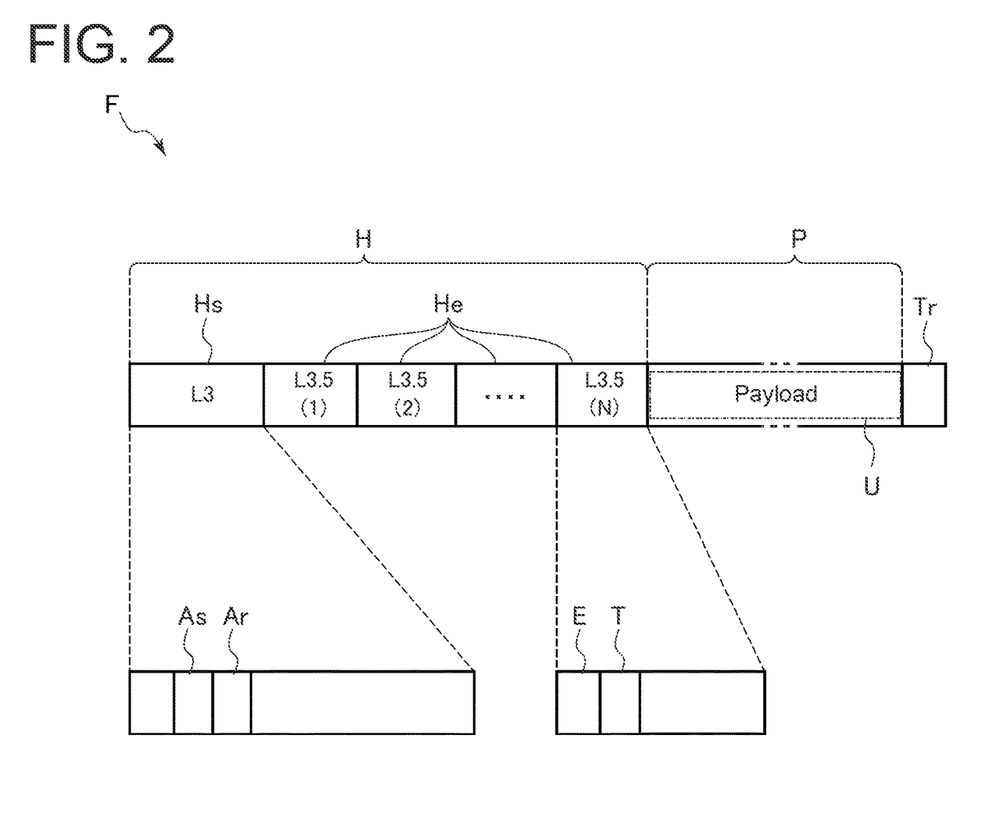
FIG. 2 is a schematic configuration diagram of a control frame according to an embodiment of the present invention.

FIG. 1 is a schematic configuration diagram of a control system 8 according to an embodiment of the present invention. FIG. 2 is a schematic configuration diagram of a control frame F according to an embodiment of the present invention.

As shown in FIG. 1, the control system 8 includes a field device 91 installed in a plant, for example, a control device 93 configured to control and monitor the field device 91, and a control network 81 communicably connecting the field device 91 and the control device 93. The field device 91 is various measuring instruments (sensors) for measuring temperature, flow rate, and pressure, and final control elements such as dampers and regulating valves (valves). Generally, multiple field devices 91 are installed in the plant. The control device 93 is a device that performs automatic control of the plant and input/output processing with the site, such as a distributed control system (DCS).

The control system 8 shown in FIG. 1 is an industrial control system (ICS) for monitoring and controlling social infrastructure such as electric power, gas, and water, or a plant such as a power generation plant and a chemical plant. In the control system 8, the control device 93 is also connected to a control information network 82 connected to various computer devices for controlling, monitoring, or managing the plant, such as an operator station (OPS 94), which is a human machine interface (HMI) for operating and monitoring the plant, and an accessory station (ACS 95) for storing and managing a large amount of plant data. The control information network 82 is constructed by, for example, Ethernet (registered trademark), and is connected to a LAN (local area network) in an office constituting an information system or an information system network 83 such as the Internet via a firewall device 96 or the like.

In the embodiment shown in FIG. 1, the field devices 91 are connected to the control network 81 via input/output devices 92 such as IO modules (IOM). The input/output device 92 is a device capable of connecting at least one field device 91 to the control network 81. Communication between the control device 93 and each field device 91 is performed via the control network 81 and the input/output device 92. Specifically, communication of a command (communication information U) from the control device 93 to each field device 91 is performed with the input/output device 92 as the destination on the control network 81. Further, the command is executed by outputting a control signal corresponding to the command received by the input/output device 92 to an actuator of the field device 91 as the command destination. Conversely, communication for transmitting a sensor value (communication information U) of the field device 91 to the control device 93 is performed with the control device 93 as the destination on the control network 81 via the input/output device 92 which acquires the communication information U.

More specifically, for example, communication between the control device 93 and the input/output device 92 via the control network 81 is performed by a control frame F (FIG. 2) having a function of a network layer. The control frame F has a header part H and a payload part P, as shown in FIG. 2. The control frame F may have a trailer part Tr placed immediately after the payload part P, as shown in FIG. 2.

The header part H is an area for storing header information such as a destination address Ar and a source address As of the control frame F required for routing from the source device (e.g., control device 93 or input/output device 92) to the destination device (input/output device 92 or control device 93). The payload part P is an area for storing communication information U (application data) to be communicated with the communication partner. The source device places the communication information U in the control frame F and then transmits a communication frame D (unit of transmission data) encapsulated in a frame of a data link layer to the control network 81. The destination device processes the communication frame D addressed thereto and received from the control network 81 to acquire the control frame F. In the embodiment shown in FIG. 1, the control network 81 is constructed by Ethernet (registered trademark), and the control frame F is placed in a MAC frame and sent through the control network 81.

However, the present invention is not limited to the present embodiment. In some embodiments, the lower layer (second layer and below) carrying the control frame F may be any protocol. In addition, although two input/output devices 92 (IO modules) are shown in FIG. 1, the number of input/output devices 92 may be any value, for example, an appropriate value depending on the scale of the plant. Further, although the input/output device 92 is the IO module, at least one may be a programmable logical controller (PLC). PLC can also be connected to one or more field devices 91.

Here, it may be necessary to change the structure (format) of the control frame F (header part H), for example, by adding new header information to the header part H of the control frame F of the network layer. For example, the sequence number that has not been contained in the header part H may be added as new header information to extend the function. It is not easy to change the design of the structure of the header part H in this way. It is a heavy burden to change the design of the structure of the header part H every time the need for the change arises.

To solve this problem, the structure of the header part H of the control frame F is divided into a standard header part Hs for defining header information essential for implementing a network layer function such as a source address As and a destination address Ar, and an extension header part He for defining header information necessary for executing an extension function (additional function), and the extension header part He is increased by the number of extension functions to execute the extension functions.

The structure of the header part H of the control frame F will be described.

(Structure of Header Part H of Control Frame F)

Specifically, the header part H of the control frame F is configured to be able to have one standard header part Hs (L3 in FIG. 2) and N (N≥0) extension header parts He corresponding to N extension functions (L3.5 in FIG. 2). The upper limit of N may be determined. The upper limit of N may be, for example, the number of extension header parts He that can be stored in the remaining area of the header part H having a fixed length in the control frame F, excluding the standard header part Hs. This allows the maximum number of extension header parts He to be stored in the header part H having a fixed length.

Each extension header part He has an area (hereinafter, protocol field) for defining extension header presence/absence information E that indicates whether the header part H has another extension header part He to be processed in addition to this extension header part He. Thus, by referring to the extension header presence/absence information E of the extension header part He that is recognized in the header part H, it is possible to determine whether there is another extension header part He. In short, since the multiple extension header parts He are chained together, it is possible to process all extension header parts He included in the header part H by tracing the extension header presence/absence information E.

Thus, when the header part H of the network layer (e.g., header part H of control frame F described above) carrying communication information communicated between communication processing devices via the network has one or more extension header parts He, it includes the standard header part Hs standardly included in the header part H and at least one extension header part He for defining header information different from header information defined by the standard header part Hs. Further, when the processing order of the extension header part He of the header part H is indicated by i (i is an integer of 1 or more), the i-th extension header part He contains the extension header presence/absence information E that indicates the presence or absence of the i+1th extension header part He.

For example, FIG. 2 shows the case where the control frame F has a plurality of (N in total) extension header parts He. Here, the first extension header part He is placed immediately after the standard header part. In other words, the first extension header part He is stored from the bit position following the bit position where the last bit information of the standard header part Hs, which has a fixed size, is stored. Further, the second extension header part He is placed immediately after the first extension header part He. Thus, the i+1th extension header part He is placed immediately after the i-th extension header part He, which facilitates the identification of the head of each extension header part He and simplifies the management of the extension header part.

In the embodiment shown in FIG. 2, the extension header part He has a fixed length (e.g., 4 bytes), and has an area for storing information of the extension header presence/absence information E, an area for storing type information T that indicates the content of the extension function, and an area for storing a value (control value) corresponding to the type information T. The extension header presence/absence information E is placed at the beginning of the extension header part He. The size of each area is fixed. For example, when the sequence number is added by the extension header part He, the type information T indicates that the control value is the value of the sequence number.

The size of the area of the extension header presence/absence information E in the extension header part He is 1 bit. Further, for example, a value of the extension header presence/absence information E of the i-th extension header part He of 1 indicates that there is the i+1th extension header part He, and a value of 0 indicates that there is no i+1th extension header part He. Alternatively, a value of the extension header presence/absence information E of 1 may indicate that there is no next extension header part He. and a value of 0 may indicate that there is the next extension header part He. Thus, the size of the extension header part He can be minimized.

On the other hand, the standard header part Hs may also have a fixed length, and areas for storing various header information may be defined in a predetermined area in the standard header part Hs. In the embodiment shown in FIG. 2, the standard header part Hs has a fixed length and has at least the source address As and the destination address Ar.

(Configuration of Communication Processing Device 1)

Next, the communication processing device 1 for processing the control frame F having the above-described structure of the header part H of the network layer will be described with reference to FIG. 3.

Figure 3:
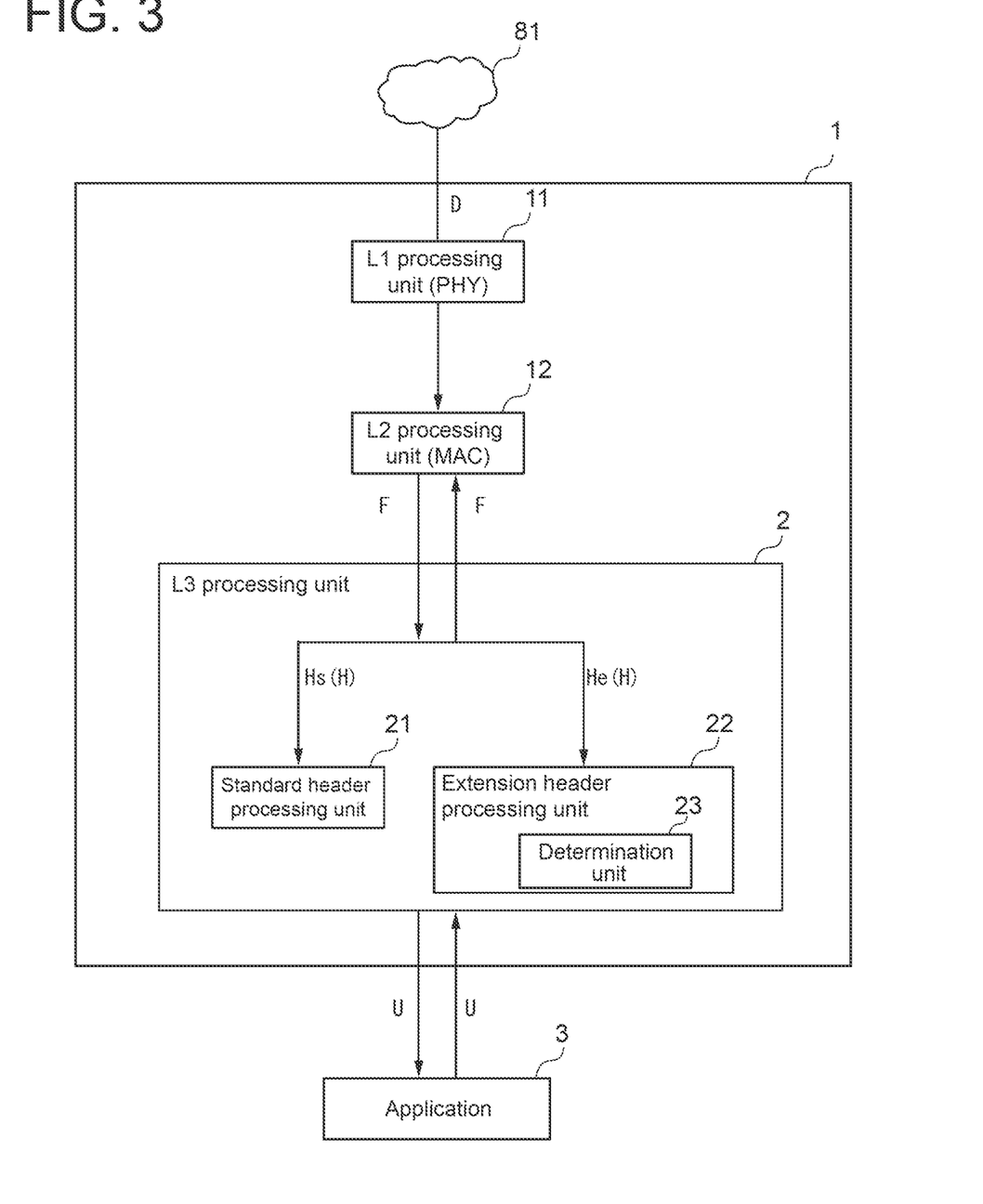
FIG. 3 is a schematic configuration diagram of a communication processing device according to an embodiment of the present invention.

FIG. 3 is a schematic configuration diagram of the communication processing device 1 according to an embodiment of the present invention.

Figure 5:
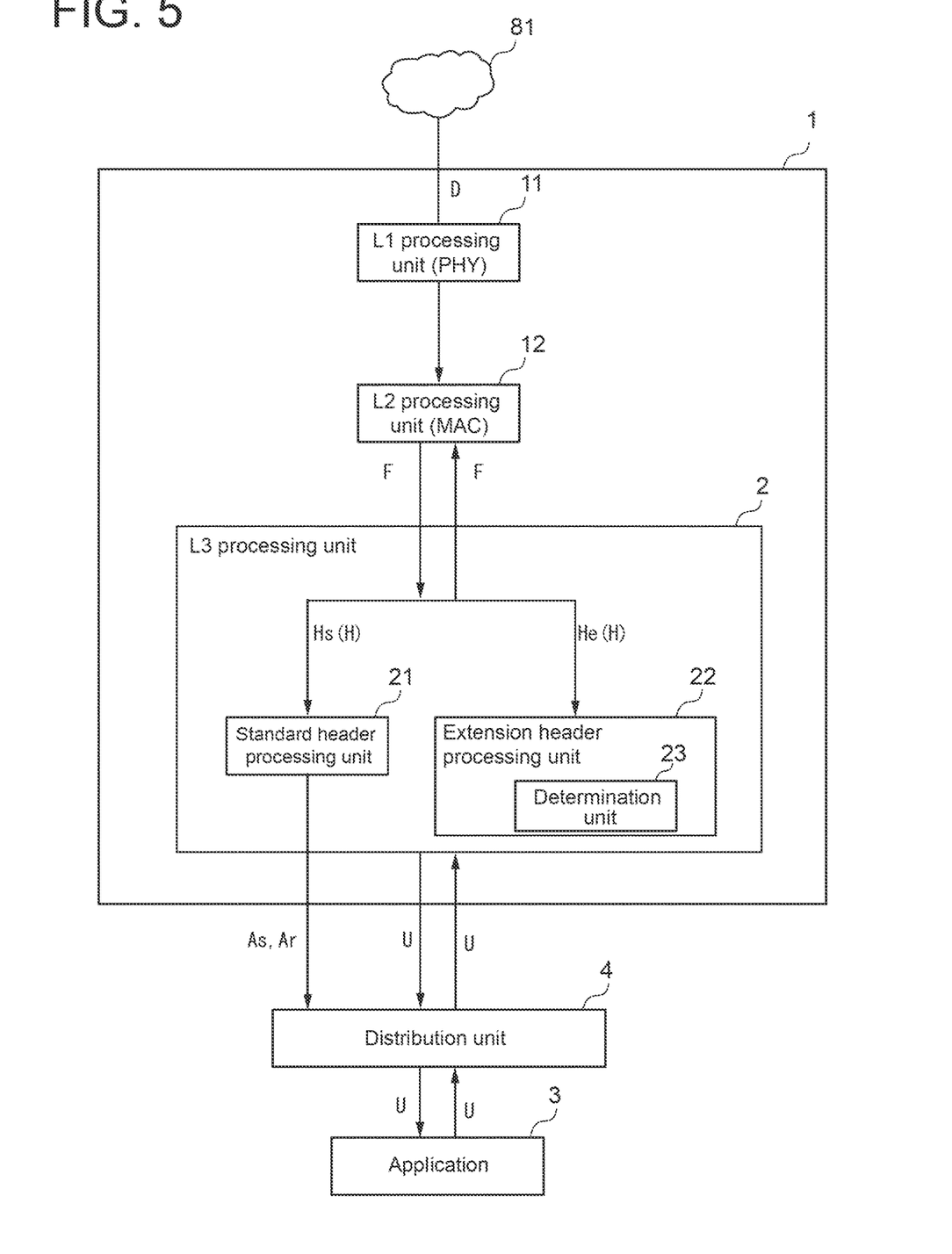
FIG. 5 is a schematic configuration diagram of a communication processing device according to an embodiment of the present invention, where the communication processing device is connected to a distribution unit.

As shown in FIG. 3 (the same applies to FIG. 5 described later), the communication processing device 1 includes a processing unit (hereinafter, L3 processing unit 2) configured to process the network layer of the communication frame D received from a transmission line (control network 81 in FIGS. 1 and 3). The L3 processing unit 2 includes a first processing unit (hereinafter, standard header processing unit 21) for processing the standard header part Hs, a second processing unit (hereinafter, extension header processing unit 22) for, if the header part H has at least one extension header part He, processing the extension header part He, and a determination unit 23 for determining the presence or absence of the i+1th extension header part He, based on the extension header presence/absence information E contained in the i-th extension header part He (i is an integer of 1 or more).

The communication processing device 1 may be provided in the input/output device 92 and the control device 93 which perform communication via the control network 81 or the ACS 95 described above. It may be provided in a network device constituting the control network 81 or the control information network 82. In this case, the communication processing device 1 forwards the control frame F to a next-hop device without processing the communication information U placed in the control frame F.

In the embodiment shown in FIG. 3, the communication processing device 1 further includes an L1 processing unit 11 for processing a physical layer of the communication frame D received from the transmission line, and an L2 processing unit 12 for processing a data link layer extracted from the communication frame D by the processing of the L1 processing unit 11. The L1 processing unit 11 and the L2 processing unit 12 are connected, and the L2 processing unit 12 and the L3 processing unit 2 are connected. After processing the physical layer by the L1 processing unit 11 and processing the data link layer by the L2 processing unit 12, the control frame F of the network layer extracted from the communication frame D is input to the L3 processing unit 2, and the control frame F is processed by the L3 processing unit 2.

Specifically, as shown in FIG. 3, the standard header processing unit 21 acquires header information, for example, based on the size and the bit position from the beginning of the standard header part Hs of the control frame F, and executes processing according to the header information. Similarly, the extension header processing unit 22 acquires header information of the extension header part He in the same control frame F, and executes processing according to the header information.

More specifically, for example, the standard header part Hs may contain header information (first extension header presence/absence information) that indicates the presence or absence of the first extension header part He, and the extension header processing unit 22 may determine the presence or absence of the first extension header part He based on this header information. For example, as with the above-described extension header presence/absence information E, the first extension header presence/absence information may have a size of 1 bit, for example, and may be configured to indicate the presence or absence of the first extension header part He by the bit value (binary value). In this case, it is possible to deal with the case where the control frame F does not have the extension header part He.

Alternatively, in some embodiments, the header part H may always have the first extension header part He. In this case, the extension header processing unit 22 always performs the processing of the first extension header part He. On the other hand, the extension header processing unit 22 determines the presence or absence of the second extension header part He based on a value of the bit position of the extension header presence/absence information E of the first extension header part He in the header part H. For example, if the first extension header part He is placed immediately after the standard header part Hs, it is easy to identify the bit position of the extension header presence/absence information E thereof.

Further, the communication processing device 1, which is the control device 93 or the input/output device 92, extracts the communication information U stored in the payload part P of the control frame F to forward the information to an application 3 (application layer). This application 3 may run on the communication processing device 1 or may run on a device different from the communication processing device 1. Further, the application 3 may be, for example, a program for controlling the field device 91, and may execute a command stored in the communication information U to the field device 91 which is the command destination.

On the other hand, in response to a communication request of communication information U from the application 3, the L3 processing unit 2 generates a control frame F on which the communication information U is placed, and inputs it to the L2 processing unit 12. The control frame F is then sequentially processed by the L2 processing unit 12 and the L1 processing unit 11 and transmitted to the transmission line in units of the communication frame D.

In the embodiment shown in FIG. 3, the communication processing device 1 includes the L1 processing unit 11 and the L2 processing unit 12. However, in some embodiments, the communication processing device 1 may be connected to a device including the L2 processing unit 12, for example, a device including the L1 processing unit 11 and the L2 processing unit 12. The application 3 to which the communication information U from the L3 processing unit 2 is forwarded may be identified based on the header information of the header part H such as the standard header part Hs.

Further, the communication processing device 1 may comprise a computer. Specifically, it may be provided with a CPU (processor) (not shown) and a memory such as ROM or RAM, and the CPU may operate (e.g., computation of data) in accordance with a program instruction (communication processing program) loaded to the memory (main storage device) to implement the functional units of the communication processing device 1.

Figure 4:
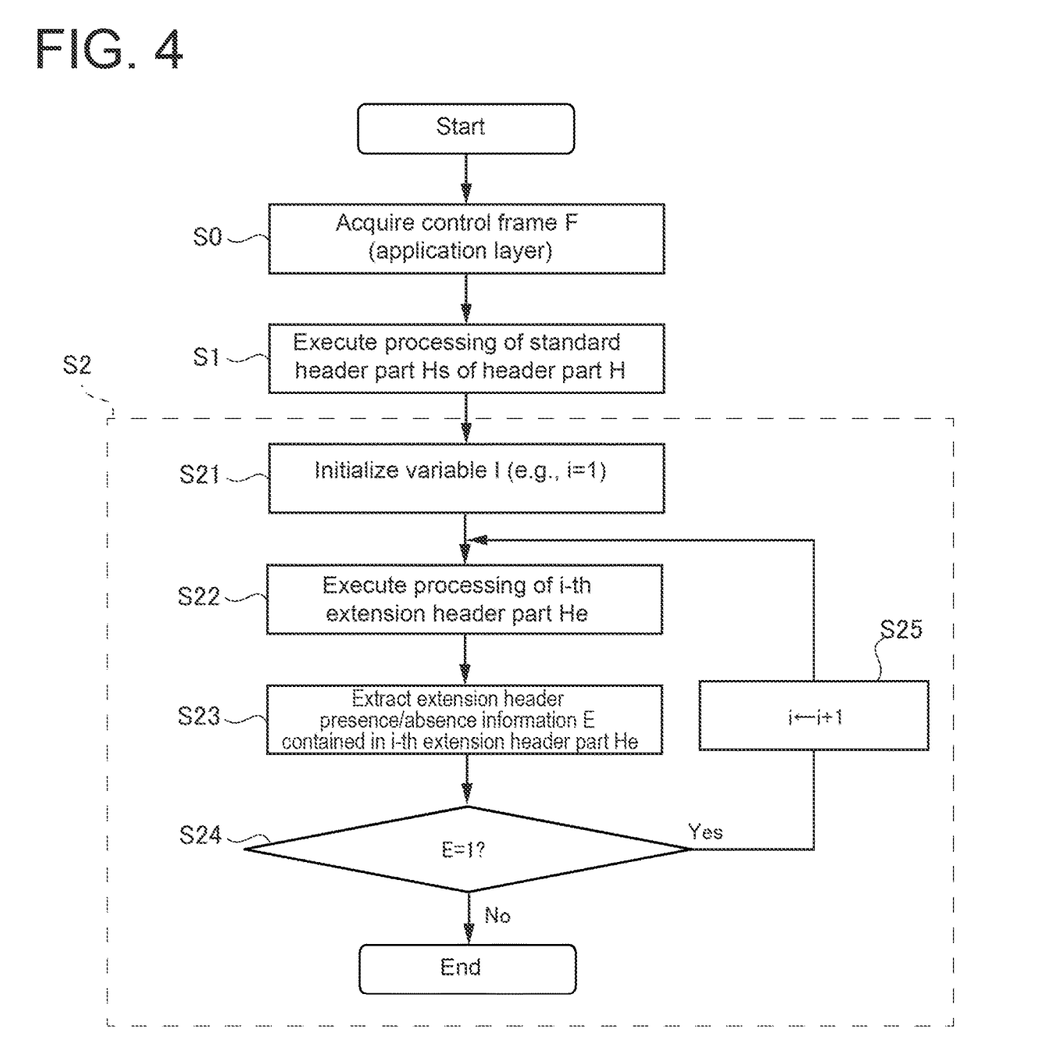
FIG. 4 is a diagram of a communication processing method according to an embodiment of the present invention.

Next, the communication processing method corresponding to the process performed by the communication processing device 1 will be described with reference to FIG. 4. FIG. 4 is a diagram of the communication processing method according to an embodiment of the present invention.

The communication processing method shown in FIG. 4 is a method for processing the network layer of the communication frame D received from the transmission line (control network 81 in FIGS. 1 and 3). As shown in FIG. 4, the communication processing method includes a first processing step of processing the standard header part Hs, a second processing step of, if the header part H has at least one extension header part He, processing the extension header part He, and a determination step of determining the presence or absence of the i+1th extension header part He, based on the extension header presence/absence information E contained in the i-th extension header part He (i is an integer of 1 or more).

The first processing step, the second processing step, and the determination step are the same as the processes executed by the standard header processing unit 21 (first processing unit), the extension header processing unit 22 (second processing unit), and the determination unit 23 already described and thus will not be described again in detail.

In the embodiment shown in FIG. 4, when the control frame F is acquired in step S0, the standard header part Hs of the header part H is processed in step S1, and the second processing step and the determination step are performed in step S2. Specifically, the variable i is initialized in step S21 (for example, i=1), and the i-th extension header part He is processed in step S22. In the embodiment shown in FIG. 4, it is assumed that the header part H of the control frame F has at least one extension header part He.

In step S23, the value of the extension header presence/absence information E contained in the i-th extension header part He is extracted. Then, in step S24, if the value of the extension header presence/absence information E extracted in step S23 is 1, it is determined that there is the i+1th extension header part He to be processed, and the process proceeds to step S25. In step S25, the variable i is incremented, and the process returns to step S22. Conversely, if the value of the extension header presence/absence information E is 0 in step S24, for example, the communication information U of the payload part P of the control frame F is passed to the application 3, and the flow is terminated.

The order of steps S21 to S23 in FIG. 4 may be changed. For example, the processing of the standard header part Hs (S1) may be performed after the processing of the extension header part He (S22), or may be performed in parallel. Further, the processing of the extension header part He (S23) may be performed before the checking of the value of the extension header presence/absence information E (S24), or may be performed in parallel.

According to the above configuration, if the header part of the network layer (header part H of control frame F described above) has the extension header part He in addition to the standard header part Hs, on the basis of the extension header presence/absence information E contained in the extension header part He, it is determined whether there is another extension header part He to be processed in addition to the extension header part He that is already recognized, and the processing is executed. As a result, the presence of all extension header parts of the received communication frame can be appropriately determined, and the network layer can be processed correctly. Therefore, it is possible to avoid, for example, mistakenly processing data stored in the payload part P of the network layer as the extension header part He even though the extension header part He is not included or failing to process the extension header part.

The present invention is not limited to the embodiments described above, but includes modifications to the embodiments described above, and embodiments composed of combinations of those embodiments.

APPENDIX (1) A communication processing device (1) according to at least one embodiment of the present invention comprises: a processing unit (2) configured to process a network layer of a communication frame (D) received from a transmission line (control network 81 in FIGS. 1 and 3). A header part (H) of the network layer contains extension header presence/ absence information (E) that indicates whether the header part (H) has an extension header part (He) for defining header information different from header information defined by a standard header part (Hs) standardly included in the header part (H). The processing unit (2) includes: a first processing unit (21) for processing the standard header part (Hs); a second processing unit (22) for, if the header part (H) has one or more extension header parts (He), individually processing the one or more extension header parts (He) of the header part (H); and a determination unit (23) for determining presence or absence of an i+1th extension header part (He), based on the extension header presence/ absence information (E) contained in an i-th extension header part (He), where i is an integer of 1 or more.

According to the above configuration (1), if the header part (H) of the network layer (e.g., header part (H) of control frame (F) described below) has the extension header part (He) in addition to the standard header part (Hs), on the basis of the extension header presence/absence information (E) contained in the extension header part (He), it is determined whether there is another extension header part (He) to be processed in addition to the extension header part (He) that is already recognized, and the processing is executed. As a result, the presence of all extension header parts (He) of the received communication frame (D) can be appropriately determined, and the network layer can be processed correctly. Therefore, it is possible to avoid, for example, mistakenly processing data stored in the payload part (P) of the network layer as the extension header part (He) even though the extension header part (He) is not included or failing to process the extension header part (He).

(2) In some embodiments, in the above configuration (1), a first extension header part (He) is placed immediately after the standard header part (Hs), and the i+1th extension header part (He) is placed immediately after the i-th extension header part (He).

According to the above configuration (2), the extension header part (He) is defined in order immediately following the standard header part (Hs). This facilitates the identification of the head of each extension header part (He) and simplifies the management of the extension header part (He).

(3) In some embodiments, in the above configuration (1) or (2), the extension header part (He) has a fixed length.

According to the above configuration (3), it is possible to increase the processing speed of the extension header part (He).

(4) In some embodiments, in any one of the above configurations (1) to (3), the size of an area of the extension header presence/absence information (E) in the extension header part is (He) 1 bit.

According to the above configuration (4), it is possible to minimize the size of the extension header part (He).

(5) In some embodiments, in any one of the above configurations (1) to (4), the extension header part (He) contains type information (T), and the second processing unit (22) executes processing according to the type information (T) extracted from the extension header part (He).

According to the above configuration (5), the structure of the extension header part (He) can be unified for each function, so that it is possible to flexibly respond to function extension of the protocol of the network layer.

(6) A communication processing method according to at least one embodiment of the present invention comprises: a processing step of processing a network layer of a communication frame (D) received from a transmission line (control network 81 in FIGS. 1 and 3). A header part (H) of the network layer contains extension header presence/absence information (E) that indicates whether the header part (H) has an extension header part (He) for defining header information different from header information defined by a standard header part (Hs) standardly included in the header part (H). The processing step includes: a step of processing the standard header part (Hs); a step of, if the header part (H) has one or more extension header parts (He), individually processing the one or more extension header parts (He) of the header part (H); and a determination step of determining presence or absence of an i+1th extension header part (He), based on the extension header presence/absence information (E) contained in an i-th extension header part (He), where i is an integer of 1 or more.

According to the above configuration (6), the same effect is achieved as in the above (1).

(7) A program according to at least one embodiment of the present invention is a program for implementing a processing unit (2) configured to process a network layer of a communication frame (D) received from a transmission line (control network 81 in FIGS. 1 and 3). A header part (H) of the network layer contains extension header presence/absence information (E) that indicates whether the header part (H) has an extension header part (He) for defining header information different from header information defined by a standard header part (Hs) standardly included in the header part (H). The program is configured to cause a computer to implement the processing unit (2) including: a first processing unit (21) for processing the standard header part (Hs); a second processing unit (22) for, if the header part (H) has one or more extension header parts (He), individually processing the one or more extension header parts (He) of the header part (H); and a determination unit (23) for determining presence or absence of an i+1th extension header part (He), based on the extension header presence/absence information (E) contained in an i-th extension header part (He), where i is an integer of 1 or more.

According to the above configuration (7), the same effect is achieved as in the above (1).

(8) A data structure of a frame of a network layer according to the present invention is a data structure of a frame of a network layer having a header part (H) and a payload part (P). The header part (H) includes: a standard header part (Hs) standardly included in the header part (H); and at least one extension header part (He) for defining header information different from header information defined by the standard header part (Hs). An i-th extension header part (He) contains extension header presence/absence information (E) that indicates presence or absence of an i+1th extension header part (He), where i is an integer of 1 or more.

According to the above configuration (8), the frame (control frame (F)) of the network layer has the standard header part (Hs) and the extension header part (He), and the extension header part (He) has an area (field) for defining the extension header presence/absence information (E). Thus, by referring to the extension header presence/absence information (E) of each extension header part (He), it is possible to check whether there is another extension header part (He) to be processed. As a result, any number of extension header parts (He) can be included in the header part (H) so that the communication device can appropriately process the header part (H) of the network layer. Therefore, it is possible to dynamically change the structure of the header part (H) of the network layer, and it is possible to easily respond to the function extension.

REFERENCE SIGNS LIST

1 Communication processing device
11 L1 processing unit
12 L2 processing unit
2 L3 processing unit (Processing unit)
21 Standard header processing unit (First processing unit)
22 Extension header processing unit (Second processing unit)
23 Determination unit
3 Application
4 Distribution unit
8 Control system
81 Control network
82 Control information network
83 Information system network
91 Field device
92 Input/output device
93 Control device
94 OPS
95 ACS
96 Firewall device
Ar Destination address
As Source address
D Communication frame
E Extension header presence/absence information
F Control frame
H Header part
Hs Standard header part
He Extension header part
T Type information
P Payload part
Tr Trailer part
U Communication information

The invention claimed is:

1. A communication processing device for processing communication via a control network between a field device installed in an industrial plant and a control device for monitoring the field device, the field device including a sensor for measuring temperature, flow rate, or pressure, which is installed in the industrial plant, the communication processing device comprising a processor of a computer, the processor of the computer is configured to execute:
   processing a physical layer of a communication frame received from the control network,
   processing a data link layer extracted from the communication frame through a processing conducted for the physical layer, and
   processing a network layer that is a control frame obtained through a processing conducted for the data link layer,
   wherein a payload part of the network layer contains a sensor value measured by the sensor,
   wherein a header part of the network layer contains extension header presence/absence information that indicates whether the header part has an extension header part for defining header information different from header information defined by a standard header part standardly included in the header part, and
   wherein the processor of the computer is further configured to execute:
      processing the standard header part;
      if the header part has one or more extension header parts, individually processing the one or more extension header parts of the header part;
      determining presence or absence of an i+1th extension header part, based on the extension header presence/absence information contained in an i-th extension header part, where i is an integer of 1 or more; and
      transmitting the sensor value extracted from the payload part to an application if it is determined that the i+1th extension header does not exist.

2. The communication processing device according to claim 1,
   wherein a first extension header part is placed immediately after the standard header part, and
   wherein the i+1th extension header part is placed immediately after the i-th extension header part.

3. The communication processing device according to claim 1,
   wherein the extension header part has a fixed length.

4. The communication processing device according to claim 1,
   wherein a size of an area of the extension header presence/absence information in the extension header part is 1 bit.

5. The communication processing device according to claim 1, wherein the extension header part contains type information, and wherein the processor of the computer executes processing according to the type information extracted from the extension header part.

6. A communication processing method for processing communication via a control network between a field device installed in an industrial plant and a control device for monitoring the field device, the field device including a sensor for measuring temperature, flow rate, or pressure, which is installed in the industrial plant, the communication processing method comprising:

processing a physical layer of a communication frame received from the control network;

processing a data link layer extracted from the communication frame through the processing conducted for the physical layer, and processing a network layer that is a control frame obtained through the processing conducted for the data link layer, wherein a payload part of the network layer contains a sensor value measured by the sensor, wherein a header part of the network layer contains extension header presence/absence information that indicates whether the header part has an extension header part for defining header information different from header information defined by a standard header part standardly included in the header part, and wherein the processing of the network layer includes:
processing the standard header part;
if the header part has one or more extension header parts, individually processing the one or more extension header parts of the header part; and
determining presence or absence of an i+1th extension header part, based on the extension header presence/absence information contained in an i-th extension header part, where i is an integer of 1 or more
transmitting the sensor value extracted from the payload part to an application if it is determined that the i+1th extension header does not exist.

7. A non-transitory computer readable medium recorded with a program for processing communication via a control network between a field device installed in an industrial plant and a control device for monitoring the field device, the field device including a sensor for measuring temperature, flow rate, or pressure, which is installed in the plant, the program causing a computer to execute:

processing a physical layer of a communication frame received from the control network, processing a data link layer extracted from the communication frame, and processing a network layer that is a control frame obtained through a processing conducted for the data link layer, wherein a payload part of the network layer contains a sensor value measured by the sensor, wherein a header part of the network layer contains extension header presence/absence information that indicates whether the header part has an extension header part for defining header information different from header information defined by a standard header part standardly included in the header part, and wherein the program is further configured to cause a computer to execute:
processing the standard header part;
if the header part has one or more extension header parts, individually processing the one or more extension header parts of the header part; and
determining presence or absence of an i+1th extension header part, based on the extension header presence/absence information contained in an i-th extension header part, where i is an integer of 1 or more
transmitting the sensor value extracted from the payload part to an application if it is determined that the i+1th extension header does not exist.

* * * * *